March 15, 1927.

C. SILVERTHORN 1,621,138

ANTISKID DEVICE FOR MOTOR VEHICLES

Filed Oct. 21, 1925

Inventor
Charles Silverthorn.

By Ralph T. Barrett
Attorney

Patented Mar. 15, 1927.

1,621,138

UNITED STATES PATENT OFFICE.

CHARLES SILVERTHORN, OF PONTIAC, MICHIGAN.

ANTISKID DEVICE FOR MOTOR VEHICLES.

Application filed October 21, 1925. Serial No. 63,882.

This invention relates to an anti-skid device for motor vehicles and the like.

The object of this invention is to provide a device for a motor vehicle capable of movement into and out of engagement with the tractive surface over which the vehicle is travelling to prevent undesirable side movement on skidding.

This invention embodies a pair of discs carried by a hanger from the rear axle and operating means therefor including a lever, connecting cables and a tension spring.

Other objects will more clearly hereinafter appear by reference to the accompanying drawings forming a part of this specification and wherein like numerals of reference designate corresponding parts throughout the several views, in which—

Figure 1:
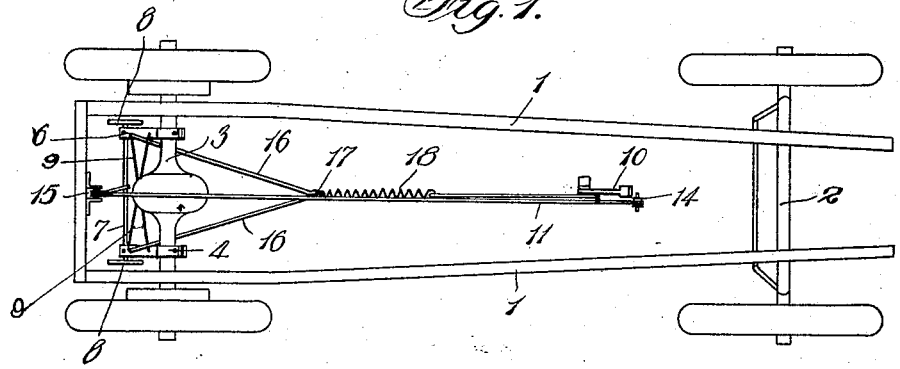
Figure 1 is a top plan view of a chassis showing the present invention in elevated position.
Figure 2:
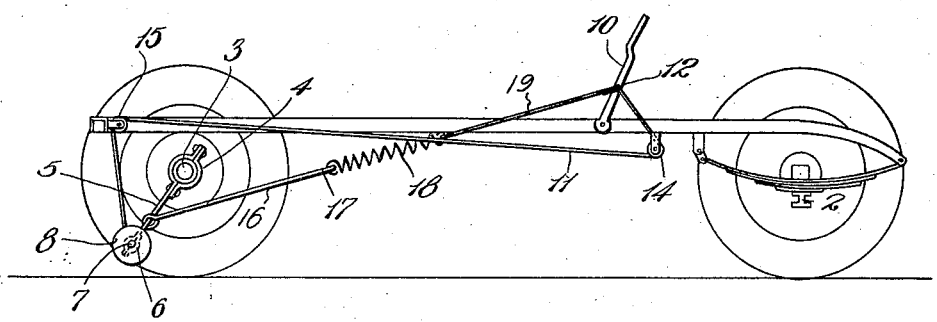
Figure 2 is a vertical sectional view of the chassis with the device positioned as in Figure 1.
Figure 3:
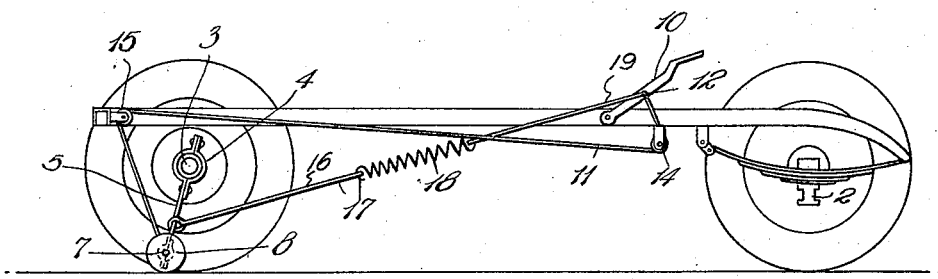
Figure 3 is a view similar to Figure 2 with the device in lowered position.

In the present illustration of the invention, a vehicle is illustrated and includes the frame 1, front axle 2 and rear axle 3. A pair of spaced hangers more clearly illustrated in Figures 2 and 3, are mounted on the rear axle 3. These hangers include upper clamps 4 which engage the axle at points adjacent the two rear wheels, shank portions 5 and lower boxings 6 through which the shaft 7 extends. Discs 8 are mounted on the extremities of the shaft 7 and are positioned by any suitable means to prevent lateral movement. Cross braces 9 connect the spaced shanks 5 and form a rigid framework capable of unitary movement by means hereinafter described.

For operating the present device, any suitable control lever may be utilized. In the present embodiment a hand lever 10 is shown as pivoted in a position to be operated from the driver's seat. A cable 11 extends from the lever at a point 12 downward over the pulley 14 extending beneath the frame rearward to a similar pulley 15 mounted on the rear cross frame and over this latter pulley to a central point on the shaft 7 to which it is secured. The aforesaid arrangement obviously is designed to move the device upward free from contact with the ground. To move the discs into ground engaging position, the two cables 16 are provided. These cables are secured to points on the disc carrying shaft adjacent its extremities and are united at 17 at which point the tension spring 18 is positioned. The forward end of the spring 18 is connected by cable 19 to the lever 10 and is caused to move the discs into engaging position by the forward movement of the lever.

In connection with the use and operation of the present invention, it will be readily seen that the device is intended for use under conditions when a vehicle is inclined to skid laterally of its path of travel and under such circumstances an operator, by the manipulation of the lever, can cause the discs to engage the ground with substatially any degree of pressure. The provision of the spring permits the functioning of the discs over irregular surfaces and facilitates the operation of the same. Normally the entire arrangement will be free from interference with the movement of the vehicle.

Many changes in the details of construction and arrangement of parts may be made without departing from the spirit of the invention.

What I claim is:

The combination with a vehicle wheel supported chassis having a rear axle, of a pair of depending brackets pivotally connected to the rear axle, a shaft connected to the lower ends of said brackets, small antiskid wheels mounted on the last mentioned shaft and adapted to be brought in contact with the pavement, or to be moved away from the pavement, brace rods connecting the brackets, a pulley mounted on the chassis rearwardly of the rear axle, a lever pivotally mounted on the chassis forwardly of the rear axle, a second pulley mounted on the chassis forwardly of said lever, a cable having one of its ends connected to the lever, and its other end connected to the shaft of the anti-skid wheels, said cable passing over the first mentioned pulley and under the second pulley, cable branches connected to said brackets and converging forwardly, a tension spring connected to the forward ends of said branches, and a second cable connecting the spring to said lever.

In testimony whereof I affix my signature.

CHARLES SILVERTHORN.